United States Patent
King et al.

(10) Patent No.: US 10,091,466 B2
(45) Date of Patent: Oct. 2, 2018

(54) VISUAL PERCEPTION DETERMINATION SYSTEM AND METHOD

(71) Applicant: MOTOROLA SOLUTIONS, INC., Schaumburg, IL (US)

(72) Inventors: Melanie A. King, Hollywood, FL (US); Alejandro G. Blanco, Fort Lauderdale, FL (US); Jonathan W. Cruz, Lauderhill, FL (US); Shervin Sabripour, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 232 days.

(21) Appl. No.: 15/074,752

(22) Filed: Mar. 18, 2016

(65) Prior Publication Data

US 2017/0272701 A1    Sep. 21, 2017

(51) Int. Cl.
| | |
|---|---|
| H04N 7/18 | (2006.01) |
| G08B 21/18 | (2006.01) |
| G06T 7/40 | (2017.01) |
| H04N 5/77 | (2006.01) |
| G06T 11/00 | (2006.01) |

(52) U.S. Cl.
CPC .......... *H04N 7/181* (2013.01); *G06T 7/408* (2013.01); *G06T 11/00* (2013.01); *G08B 21/182* (2013.01); *H04N 5/77* (2013.01)

(58) Field of Classification Search
None
See application file for complete search history.

(56) References Cited

U.S. PATENT DOCUMENTS

| | | |
|---|---|---|
| 2012/0249416 A1 | 10/2012 | Maciocci et al. |
| 2013/0002813 A1 | 1/2013 | Vaught et al. |
| 2015/0029168 A1 | 1/2015 | Mahowald et al. |

FOREIGN PATENT DOCUMENTS

| | | |
|---|---|---|
| WO | 2012154418 | 11/2012 |
| WO | 2015118380 | 8/2015 |

OTHER PUBLICATIONS

Ogaki et al. "Coupling Eye-Motion and Ego-Motion features for First-Person Activity Recognition," specification, Computer Vision and Pattern Recognition Workshops (CVPRW) 2012 IEEE Computer Society Conference on IEEE, (Jun. 16, 2012) pp. 1-7, XP032206810, DOI: 10.1109/CVPRW.2012.6239188 ISBN: 978-1-4673-1611-8 abstract p. 2 p. 4 and p. 6, figures 1 and 2.

(Continued)

*Primary Examiner* — Kate H Luo
(74) *Attorney, Agent, or Firm* — Michael Best & Friedrich LLP

(57) ABSTRACT

Visual perception determination assistance system and method. In one embodiment, a method includes receiving, at an electronic computing device, a primary video or still image from an imaging device; receiving, at the electronic computing device, at least one vision impact parameter from at least one sensor device, the at least one vision impact parameter being indicative of an ability of an observer to visually perceive a scene captured in the primary video or still image; storing the primary video or still image and the at least one vision impact parameter in a memory; identifying, by a processor electrically coupled to the memory, a timing correlation between the primary video or still image and the at least one vision impact parameter; and storing the timing correlation in the memory.

18 Claims, 12 Drawing Sheets

(56) References Cited

OTHER PUBLICATIONS

Wallace et al., "Rats maintain an overhead binocular field at the expense of constant fusion," article, NATURE, vol. 498, No. 7452 (Jun. 6, 2013) pp. 65-69, XP055149858, ISSN: 0028-0836, DOI: 10.1038/nature12153 abstract, pp. 1-3, figures 1,3.
PCT/US2017/018413 International Search Report and Written Opinion of the International Searching Authority dated Apr. 28, 2017 (15 pages).

VISUAL PERCEPTION DETERMINATION SYSTEM AND METHOD

BACKGROUND OF THE INVENTION

As small and inexpensive imaging devices become more readily available, there is an increasing occurrence of video recording by ordinary citizens of interactions involving, for example, law enforcement officers and alleged criminals. Additionally, many state and local law enforcement jurisdictions already mandate or encourage officers to use imaging devices during the course of their duties. For example, dashboard-mounted imaging devices are widely used. In many instances, such imaging devices record images of activity located at the front of the vehicle from a vantage point on the dashboard looking outward through the vehicle windshield and past the vehicle hood. The use of wearable or body-mounted imaging devices is growing and such imaging devices may capture images from a vantage point that matches the location at which the imaging device is worn, which may vary. Video or other images may also be available from security, traffic, and other imaging devices. Thus, there is an increasing prevalence of video or still images available for use in evidentiary and other judicial proceedings. However, the scene shown in various recorded video or still images may not always correspond to the scene as perceived by a person involved in the recorded incident at the time of video or still image capture.

For example, the field of view of a person is limited both horizontally and vertically. Furthermore, the human eye is not capable of focusing on everything in this field of view at once. Instead, the eye pupil must contract or dilate in order to focus on objects at different distances. In addition, the eye requires an adjustment period when transitions are made between bright and dark environments, before the eye can properly see in the new environment. For example, a certain transition time may be required upon entering a darkened theater from a sidewalk bathed in sunshine, or vice versa, before full vision is obtained.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
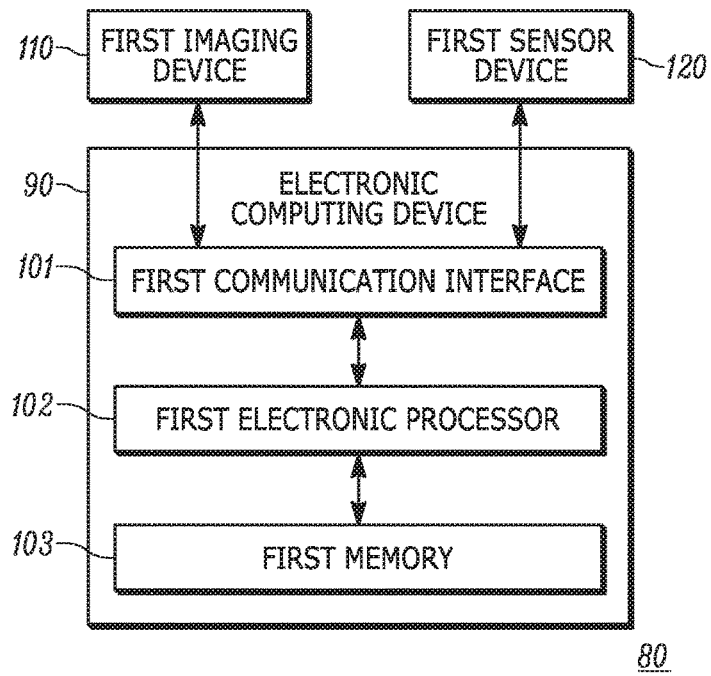
FIG. 1 is a block diagram of a visual perception determination system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method of assisting in determining visual perception. In one particular implementation, the method includes receiving, at an electronic computing device, a primary video or still image from an imaging device; receiving, at the electronic computing device, at least one vision impact parameter from at least one sensor device, the at least one vision impact parameter being indicative of an ability of an observer to visually perceive a scene captured in the primary video or still image; storing the primary video or still image and the at least one vision impact parameter in a memory; identifying, by an electronic processor electrically coupled to the memory, a timing correlation between the primary video or still image and the at least one vision impact parameter; and storing the timing correlation in the memory.

Another exemplary embodiment provides a visual perception determination assistance system. In one particular implementation, the system includes a communication interface configured to receive a primary video or still image from an imaging device, and receive at least one vision impact parameter from at least one sensor device, the at least one vision impact parameter being indicative of an ability of an observer to visually perceive a scene captured in the primary video or still image; an electronic processor electrically coupled to the communication interface and configured to identify a timing correlation between the primary video or still image and the at least one vision impact parameter, and optionally and additionally be configured to generate a secondary video or still image according to the timing correlation; and a memory electrically coupled to the electronic processor and configured to store the primary video or still image, the at least one vision impact parameter, and the timing correlation.

In order to allow for evidentiary use, the primary video or still image, the at least one vision impact parameter, and the timing correlation are preferably stored in compliance with various jurisdictional requirements for admissibility as evidence. For example, the primary video or still image, the at least one vision impact parameter, and the timing correlation may be encrypted; may be stored along with a digital signature; may include digital rights management or other forms of tamper-proofing; and/or may be equipped with other levels of data protection.

FIG. 1 illustrates an exemplary first visual perception determination system 80. In the example illustrated, the first visual perception determination system 80 includes an electronic computing device 90 that includes a first communication interface 101, a first electronic processor 102 electrically coupled to the first communication interface 101, and a first memory 103 electrically coupled to the first electronic processor 102. The first visual perception determination system 80 also includes a first imaging device 110 and at least one first sensor device 120. The first communication interface 101 receives a primary video or still image from the first imaging device 110, and receives at least one vision impact parameter from the at least one sensor device 120. The first imaging device 110 is configured to capture a still or moving image; for example, by converting incident light into an electrical signal. The first electronic processor 102 is configured to determine a timing correlation between the primary video or still image and the at least one vision impact parameter. The first memory 103 stores the primary video or still image, the at least one vision impact parameter, and the timing correlation.

The timing correlation is, for example, data that indicates a timing relationship between the primary video or still image and the at least one vision impact parameter. Thus, the timing correlation may include time information, such as a frame identifier in the primary video or still image and a timestamp in the at least one vision impact parameter. In this manner, the timing correlation may be used to verify a correspondence between the primary video or still image and the at least one vision impact parameter, and such verification may be used for evidentiary or other purposes. To facilitate such verification, the timing correlation may include information other than timing information; for example, location information, such as user coordinates (latitude, longitude, altitude), and the like. The timing information and/or the location information may be metadata that is captured by the first imaging device 110 and/or the at least one sensor device 120 during typical operation, or may be independently determined from, for example, a system clock of the electronic computing device 90.

The vision impact parameter is, for example, data that indicates a potential effect on a user's visual perception or focus. Thus, the vision impact parameter may include spatial information, such as an (x,y) coordinate within a frame of the primary video or still image or a directional orientation of the imaging device and/or the user's head or eyes; environmental information, such as ambient light or location of directional light sources; biometric information, such as pupil dilation, focus depth, or vitamin A level; object information, such as a user's eyelid state or the presence of eyewear and/or corrective lenses; and the like. The vision impact parameter may include raw data, such as the value or an array of values of the at least one vision impact parameter, or may include compressed data. The vision impact parameter may alternatively include weighted data, whereby the raw data is modified with a weight indicative of the impact of the vision impact parameter.

First memory 103 may be a volatile or non-volatile computer-readable storage medium, such as a hard disk, a CD-ROM (Compact Disc Read Only Memory), a DVD-ROM (Digital Video Disc Read Only Memory), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

First imaging device 110 may include an imaging device including a charge-coupled device (CCD) or complementary metal-oxide-semiconductor (CMOS) image sensor, scanning circuits, timing circuits, and the like; an optical system including one or more lenses, electronic or mechanical shutters, and the like; and/or signal processing circuits including analog-to-digital converters, sample-and-hold circuits, memory circuits, and the like. First imaging device 110 may be a wearable imaging device, such as an imaging device worn on the body or head of a user; a remote surveillance imaging device such as a security imaging device; an imaging device in mobile device such as a smart telephone; a dashboard imaging device; and the like.

First sensor device 120 may be a location sensor, such as a Global Positioning System (GPS) sensor, a GLObal NAvigation Satellite System (GLONASS) sensor, a Galileo sensor, and the like; an orientation sensor such as a gyroscope, an accelerometer, any other directional sensor and/or digital compass, a geomagnetic field sensor, an inertial measurement unit (IMU), and the like; a light sensor such as a photodetector, an auxiliary imaging device, and the like; an eye and/or pupil tracking sensor such as an auxiliary imaging device, an infrared light sensor, and infrared light source/sensor system, a thermal sensor, and the like; a don/doff sensor such as a conductive sensor, a user-facing imaging device, and the like; a vitamin A detector; a time detector; a peripheral sensor such as an outward-facing imaging device and the like; and combinations thereof. More than one first sensor device 120 may be provided, with each individual sensor device sensing one or more vision impact parameter.

In certain embodiments, the vision impact parameter is representative of a factor that affects a person's ability to visually perceive a scene. For example, because the human eye is not capable of focusing on everything in front of a person at the same time, the person is only able to focus on a portion of a scene at a given time. The spatial orientation of the portion of the scene is dependent on at least the direction of the head and eye. Moreover, the spatial depth of this portion is dependent on at least the pupil size (relative contraction or dilation). Therefore, a vision impact parameter may be indicative of a focus field of the user or, more particularly, a sensed focus field.

In addition, low-light vision is affected by the eye's adaptation to external lighting conditions, and by internal factors. For example, low vitamin A levels correlate with decreased low-light vision ability. Additionally, the eye requires an adjustment period when transitioning between a relatively bright environment and a relatively dark environment, and vice versa. In some cases, the eye may require up to forty minutes to adjust to a new environment. Specific user measurement data and/or modeling may be used to account for differences in adjustment times among individual users. Therefore, a vision impact parameter may be indicative of a light adaptation state of the eye.

Thus, the at least one first sensor device 120 may detect one or more vision impact parameters, such as a user location, a head orientation of a user, an ambient light intensity, an ambient light color, a duration of ambient light intensity and/or color, an eye direction of a user, a pupil focus depth of a user's eye, a pupil dilation level of a user's eye, an eyelid state, a presence of eyewear and/or corrective lenses, a vitamin A level of a user, a time of day, and the like. In certain embodiments, first imaging device 110 may also be used to determine one or more vision impact parameters. That is, certain vision impact parameters may be derived from the primary video or still image, such as by analyzing light sources in the scene over time. In this manner, the at least one vision impact parameter is indicative of an ability of a subject to visually perceive a scene present or captured in the primary video or still image.

In FIG. 1, arrows between various elements respectively represent communication links between the components of the first visual perception determination system 80. These communication links may be wired or wireless links. Typically, the first communication interface 101, first electronic processor 102, and first memory 103 are connected via wired or other physical links. First imaging device 110 and first sensor device 120 may be located proximate to or remote from the electronic computing device 90 and be connected, linked, or coupled to the first communication interface 101 using a variety of wired or wireless links. For example, a wired link may be a Universal Serial Bus (USB) link, a FireWire link, a serial link, a parallel link, an Ethernet link, a fiber link, combinations thereof, and the like. A wireless link may be a Wi-Fi link, a Bluetooth link, a Near Field Communication (NFC) link, a ZigBee link, combinations thereof, and the like. The communication links may be internal links within electronic computing device 90, or may be external links between electronic computing device 90 and separate components. Where a communication link is an external link, the external link may be removable or severable.

Figure 2:
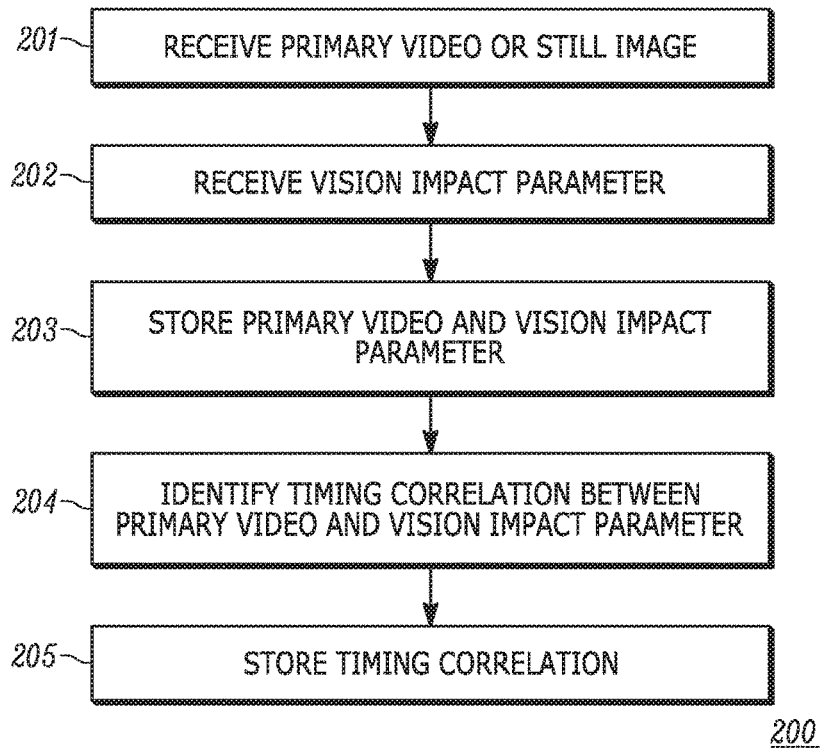
FIG. 2 is a flowchart of a method of determining visual perception in accordance with some embodiments.

FIG. 2 illustrates an exemplary method 200 of determining visual perception. The method 200 is described in relation to the electronic computing device 90, but could be performed using another device or devices. As illustrated in FIG. 2, the method 200 begins at block 201 where the electronic computing device 90 receives a primary video or still image from the first imaging device 110, for example. Next, at block 202, the electronic computing device 90 receives at least one vision impact parameter from the at least one first sensor device 120, for example. Subsequently, at block 203, the first memory 103, for example, stores the primary video or still image and the at least one vision impact parameter. Then, at block 204, the first electronic processor 102, for example, identifies a timing correlation between the primary video or still image and the at least one vision impact parameter. At block 205, the first memory 103 stores the timing correlation.

While FIG. 2 illustrates a particular ordering for determining visual perception, not all embodiments are so limited. For example, the electronic computing device 90 (or other device or devices) may receive and store the primary video or still image first, and subsequently receive and store the at least one vision impact parameter. Additionally, the electronic computing device 90 may receive the primary video or still image and a first portion of the vision impact parameters prior to storing the primary video or still image and first portion, and may later receive and store a second portion of the vision impact parameters, such as during a post-processing operation. A post-processing operation may be any operation that occurs substantially after a time of video or still image capture. In this manner, the determination as to visual perception may include data from imaging analytics such as light sources and ray tracing to supplement or determine what light arrives at the user's eyes.

Figure 3:
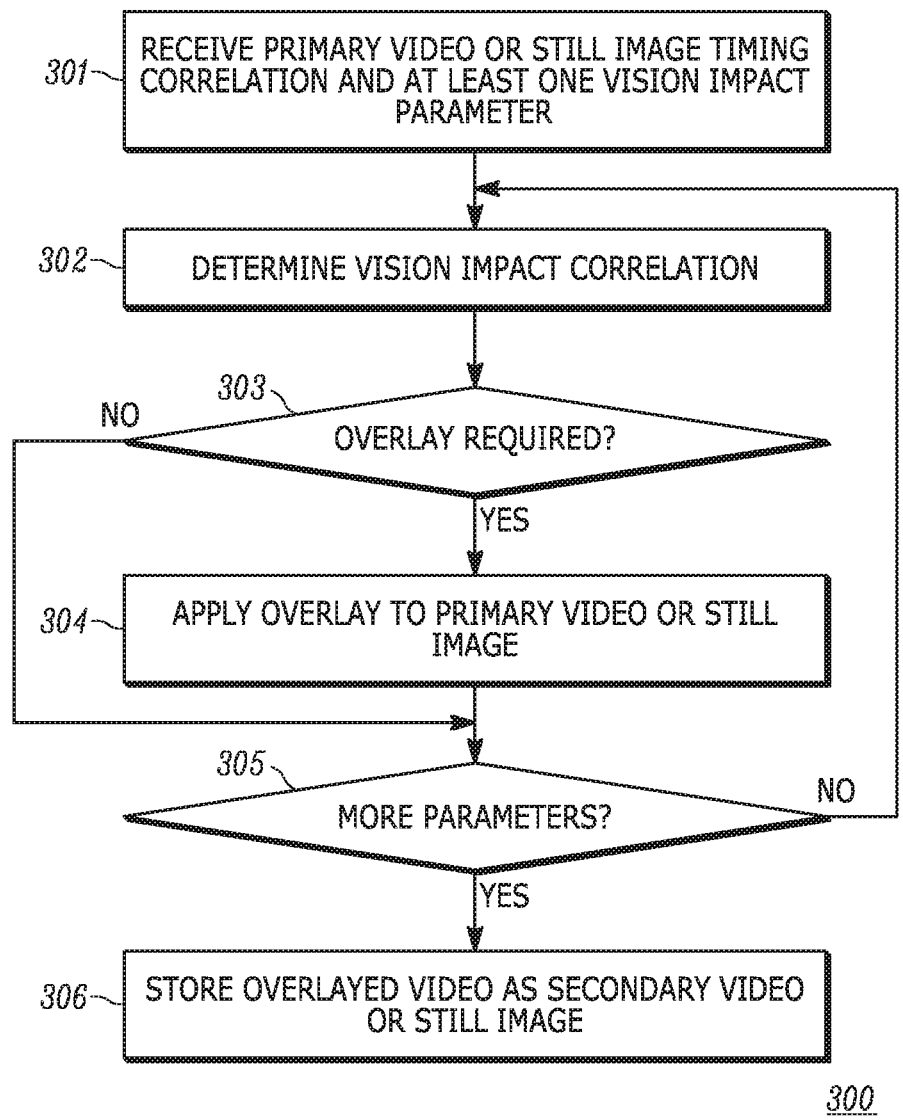
FIG. 3 is a flowchart of a method of generating a secondary video or still image in accordance with some embodiments.

FIG. 3 illustrates an exemplary method 300 of generating a secondary video or still image. The method 300 is described in relation to the electronic computing device 90, but could be performed using another device or devices. As illustrated in FIG. 3, the method 300 begins at block 301 where the first electronic processor 102 receives the primary video or still image, the timing correlation, and the at least one vision impact parameter from the first memory 103. Next, at block 302, the first electronic processor 102 determines a vision impact correlation as a function of the at least one vision impact parameter and the timing correlation. For example, where the vision impact parameter corresponds to light intensity, the first electronic processor 102 may analyze the light levels over a period of time preceding a particular frame, compare these light levels to a known table, curve, or other relationship indicative of a light response of the human eye, and determine whether the user's vision was affected. At block 303, the first electronic processor 102 analyzes the vision impact correlation to determine whether the vision impact correlation indicates that an overlay is required to be applied to the primary video or still image; for example, by analyzing the vision impact correlation as compared to a threshold information.

When the first electronic processor 102 determines that an overlay is required, the method 300 proceeds to block 304 where the first electronic processor 102 applies the overlay to the primary video or still image. In the above example of light intensity, applying the overlay may comprise applying a light adaptation filter that brightens or darkens the video frame (or frames) or the still image according to the analysis. When, for example, the vision impact parameter corresponds to user focus, applying the overlay may comprise subjecting the video or still image to a foveated rendering such that a frame area where the user was focused is shown in full resolution and other portions are shown in reduced resolution. When the first electronic processor 102 determines that no overlay is required (for example, when the analysis indicates that the corresponding vision impact parameter did not affect an ability of a wearer of an imaging device to visually perceive a scene captured in the primary video or still image), block 304 is skipped and the method 300 proceeds to block 305 where the first electronic processor 102 determines whether more vision impact parameters require analysis. When the first electronic processor 102 determines that more vision impact parameters require analysis, the method 300 returns to block 302 for the next vision impact parameter. When the first electronic processor 102 determines that no more vision impact parameters require analysis, the method 300 proceeds to block 306 where the overlaid video or still image is stored as a secondary video or still image in the first memory 103. Thus, the secondary video or still image is a different rendering of the primary video or still image to which the vision impact parameters have been applied as overlays and/or filters. Because both the primary video or still image and the secondary video or still image are stored separately, either the primary video or still image or the secondary video or still image may be accessed as necessary.

Figure 4:
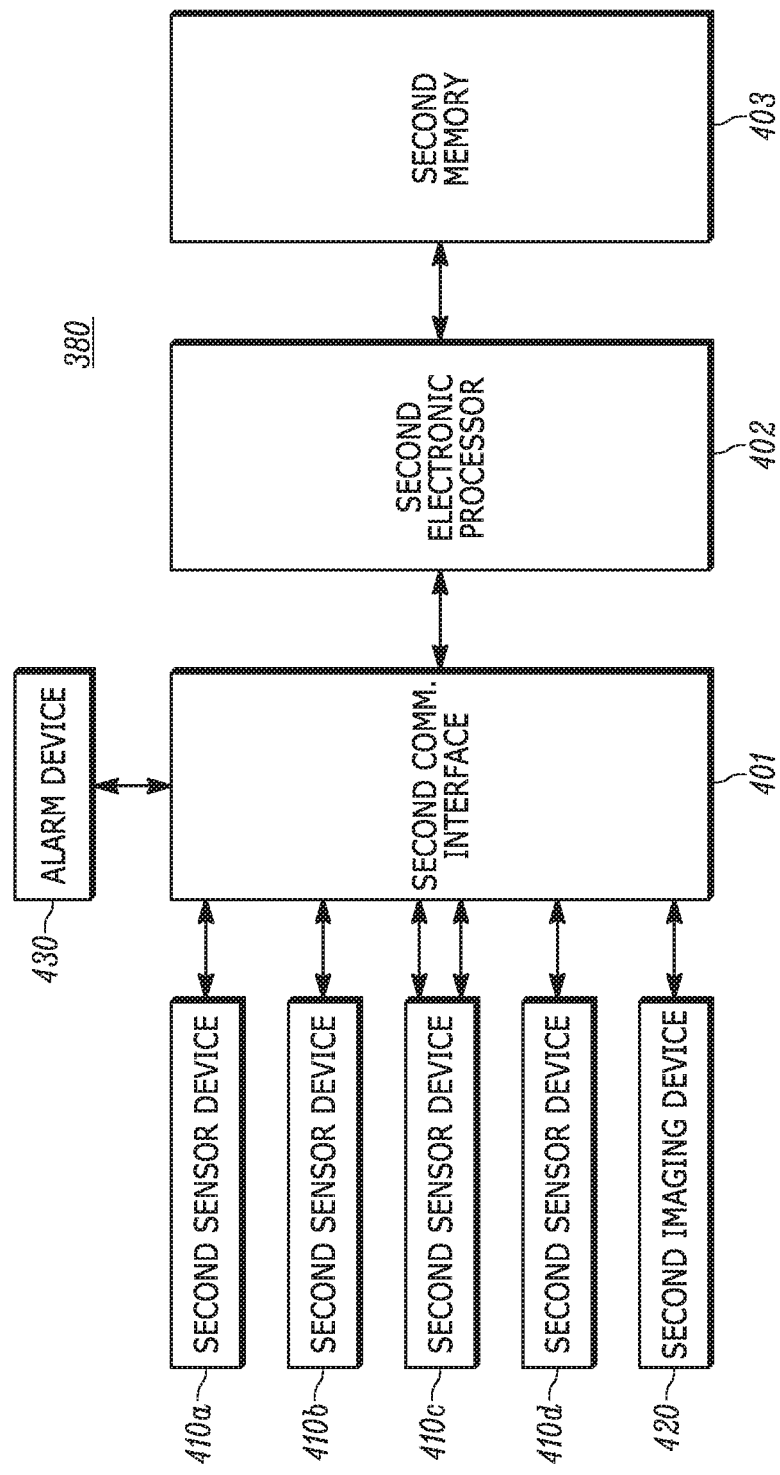
FIG. 4 is a block diagram of one embodiment of a visual perception system illustrating information flow and output for use in the operation of a real-time method of some embodiments.
Figure 5A:
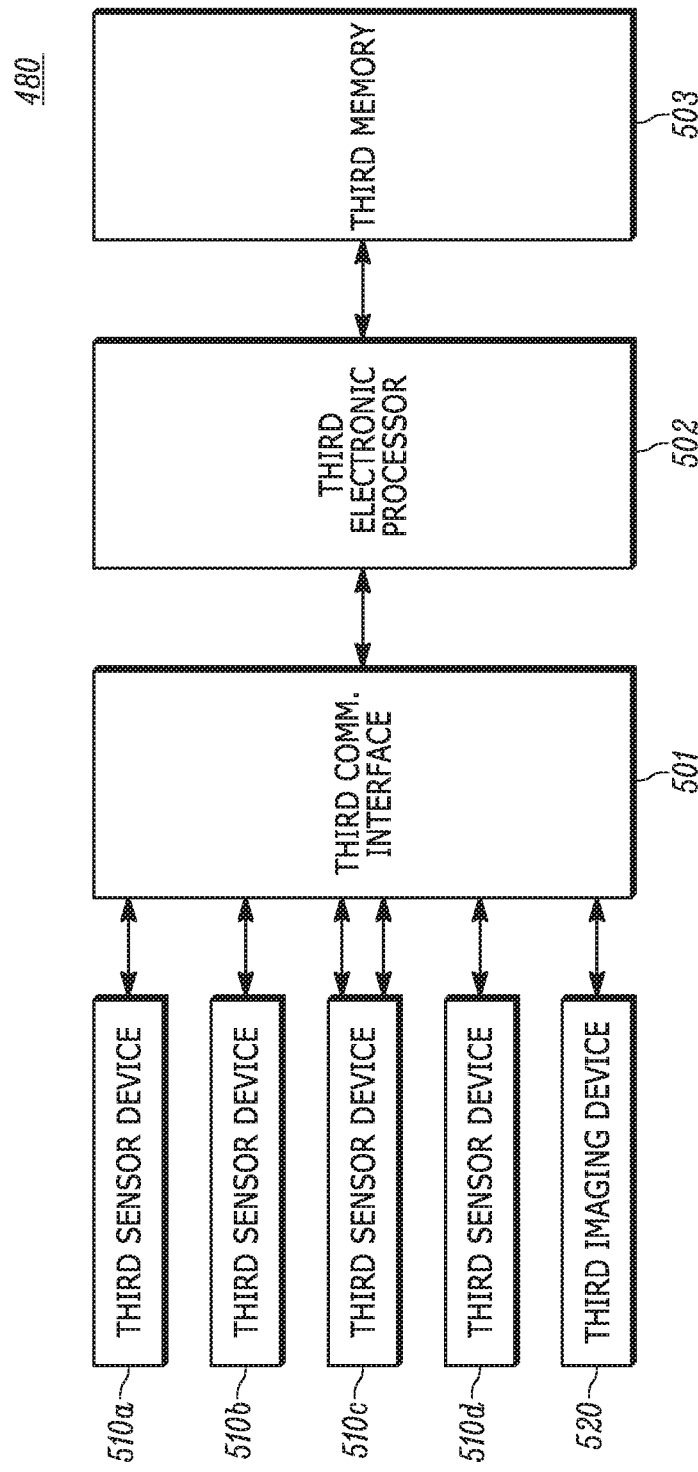
FIG. 5A is a block diagram of another embodiment of a visual perception system illustrating information flow for use in the operation of a post-processing method of some embodiments.
Figure 5B:
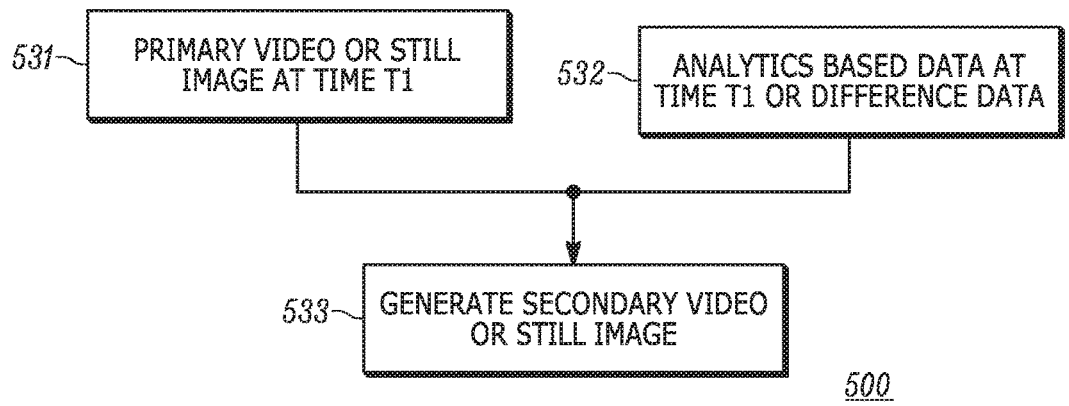
FIG. 5B is a block diagram of a post-processing method in accordance with some embodiments.

The method 300 of generating a secondary video or still image may be performed in a post-processing operation, as illustrated in FIG. 3 and FIG. 4 and described in greater detail below. As above, a post-processing operation may be any operation that occurs substantially after a time of video or still image capture. Alternatively, the method 300 may be performed in real-time with respect to the data capture, as illustrated in FIG. 5A and FIG. 5B and also described in greater detail below. Real-time processing may refer to any operation that occurs substantially at the same time as the video or still image capture, including shortly thereafter; for example, while a subsequent video frame or still image is being captured.

FIG. 4 illustrates an alternative embodiment in the form of a second visual perception determination system 380. The second visual perception determination system 380 includes an array of second sensor devices 410a through 410d (collectively referred to as second sensor devices 410) and a second imaging device 420 that provide data to a second communication interface 401. Distinct from the first visual perception system 80, the second visual perception system 380 includes an alarm device 430. The second communication interface 401 may be, but is not required to be, the same as or similar to the first communication interface 101. The second sensor devices 410 may be, but are not required to be, the same as or similar to the first sensor devices 110. The second imaging device 420 may be, but is not required to be, the same as or similar to the first imaging device 120. Some of the second sensor devices 410 may provide data regarding a single vision impact parameter, whereas other second sensor devices 410 may provide data regarding multiple vision impact parameters. The second communication interface 401 provides the data from the second sensor devices 410 to a second electronic processor 402 which may append a timestamp to the data and subsequently store the stamped data in a second memory 403. The second electronic processor 402 and the second memory 403 may be, but are not required to be, the same as or similar to the first electronic processor 102 and the first memory 103, respectively.

Data collection carried out in the second visual perception determination system 380 may be repeated at regular intervals; for example, every hour, every fifteen minutes, every minute, and the like. Using these inputs, second electronic processor 402 may compare one or more vision impact parameter to a data table or the like previously stored in memory 403. When this comparison indicates that a visual acuity of the user is impaired, second electronic processor 402 may cause second communication interface 401 to generate an alert via the alarm device 430. For example, second electronic processor 402 may compare a light level at a current time to a light level at a time fifteen minutes prior to the current time. When the comparison between the light levels indicates that the user's eye has likely not adjusted to lighting conditions, second electronic processor 402 may warn the user via alarm device 430 that the user's vision may be impaired. In this manner, alarm device 430 may be a device such as a transducer configured to provide a signal, such as an auditory, haptic, or visual signal.

FIG. 5A and FIG. 5B illustrate another alternative embodiment in the form of a third visual perception system 480. As illustrated in FIG. 5A, a third communication interface 501 receives data from an array of third sensor devices 510a through 510d (collectively referred to as third sensor devices 510) and a third imaging device 520. The third communication interface 501 may be, but is not required to be, the same as or similar to the other communication interfaces described herein. Some third sensor devices 510 may provide data regarding a single vision impact parameter, whereas other sensors 501 may provide data regarding multiple vision impact parameters. The third communication interface 501 provides the data to a third electronic processor 502 which may append a timestamp to the data and subsequently store the stamped data in a third memory 503. Additionally, the third electronic processor 502 may determine the timing correlation between the vision impact parameters and the primary video or still image and store the timing correlation in the third memory 503. The third electronic processor 502 may be, but is not required to be, the same as or similar to the other electronic processors described herein; however, the third electronic processor 502 is configured to perform additional functions as described below. Additionally, the third memory 503 may be, but is not required to be, the same as or similar to the other memories described herein.

Data collection may in this manner be repeated at regular intervals; for example, every hour, every fifteen minutes, every minute, and the like.

Third electronic processor 502 and third memory 503 cooperate to perform real-time analysis and generation of a secondary video or still image, as illustrated in FIG. 5B. In FIG. 5B, primary video or still image corresponding to a time T1 is loaded into the third electronic processor 502 described above at block 531. Additionally, stamped vision impact parameter data from time T1 is loaded into the third electronic processor 502 at block 532. Alternatively, difference data indicating a change in vision impact parameter between times T1 and T2 may be utilized. In this manner, it is possible to determine whether a user's pupil has adjusted to lighting conditions, whether the user has moved locations, and the like. Using these inputs, the third electronic processor 502 may generate a secondary video or still image at block 533; for example, in the manner described in more detail below. Once the secondary video or still image has been generated, it is stored in third memory 503

Figure 6:
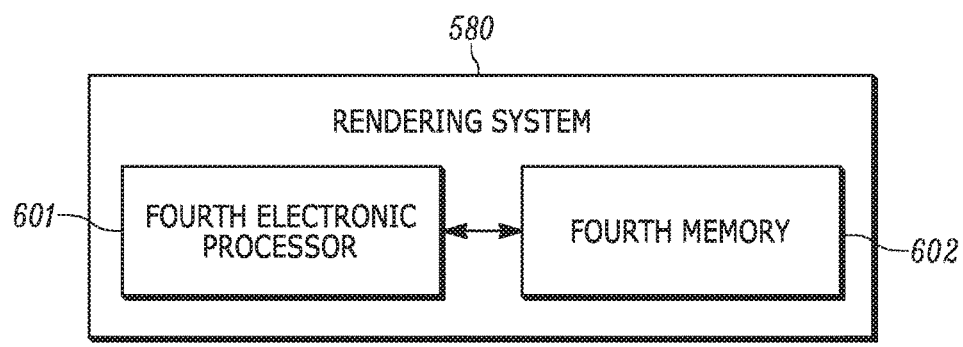
FIG. 6 is a block diagram of a rendering system in accordance with some embodiments.

FIG. 6 illustrates an exemplary rendering system 580 that may perform a post-processing as a separate and dedicated device. Rendering system 580 includes a fourth electronic processor 601 and a fourth memory 602. The fourth memory 602 may be, but is not required to be, the same as or similar to the other memories described herein. For example, the fourth memory 602 may be a removable and portable storage medium, such as a memory card. In this manner, fourth memory 602 may be transferable between a device used to initially store the primary video or still image, such as electronic computing device 90, and the rendering system 580.

The fourth electronic processor 601 receives the primary video or still image, the at least one vision impact parameter, and the timing correlation from the fourth memory 602, determines a vision impact correlation, and generates a secondary video or still image therefrom. Once generated, the secondary video or still image may be stored in the fourth memory 602 for later use. While only one memory is illustrated in FIG. 6, rendering system 580 may include multiple distinct memories; for example, a removable storage medium as the fourth memory 602 in addition to an internal memory. The fourth electronic processor 601 may generate the secondary video or still image by applying various overlays to a copy of the primary video or still image, as will be described in more detail below. Alternatively, the fourth electronic processor 601 may generate the secondary video or still image by directly transforming and/or transcoding the primary video or still image and subsequently storing a copy thereof.

FIGS. 7A through 7E illustrate an exemplary primary video or still image 700a and secondary video or still images 700b through 700e according to some embodiments of the above system and method.

Figure 7A:
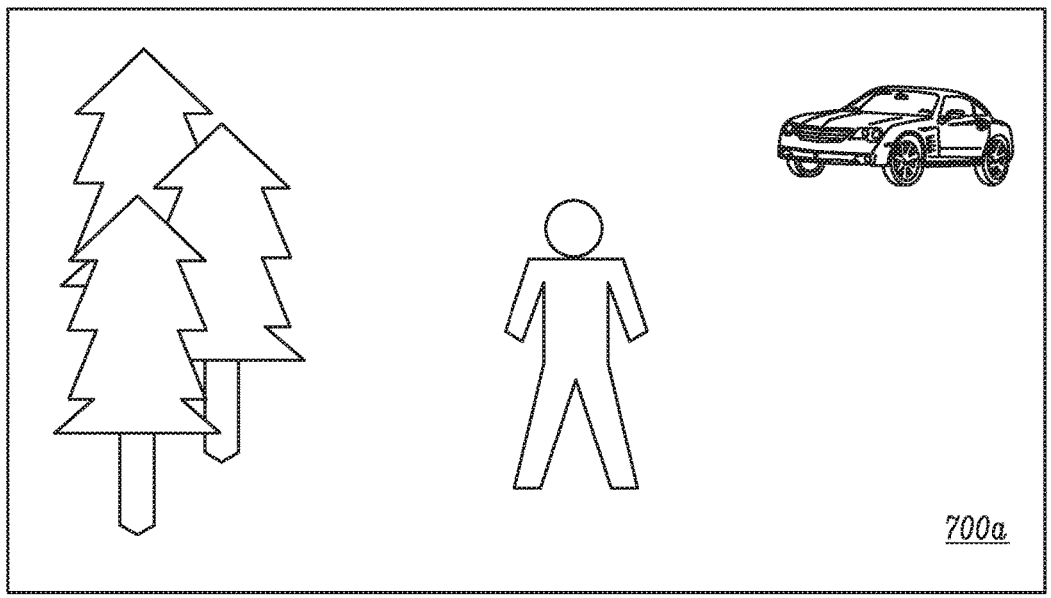
FIG. 7A is a primary video or still image representation in accordance with some embodiments.

As illustrated in FIG. 7A, the primary video or still image 700a includes various objects in the foreground, background, and periphery of the scene, all displayed as captured in full resolution. Thus, the primary video or still image 700a does not necessarily accurately indicate the visual perception of a user of the imaging device, such as imaging device 110, used to record the primary video or still image 700a, as the human eye and brain are not capable of receiving and processing the entire scene at once.

Figure 7B:
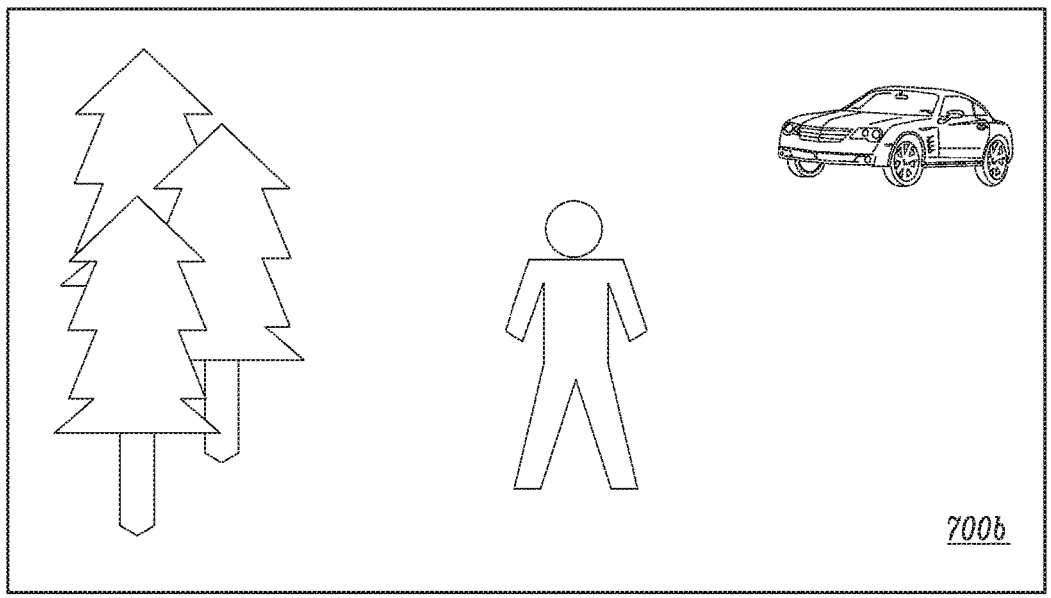
FIG. 7B is a secondary video or still image representation in accordance with some embodiments.

As illustrated in FIG. 7B, in a first secondary video or still image 700b, a scene from the primary video or still image 700a is represented at a reduced image quality. For example, the primary video or still image 700a may be represented with a reduced resolution, in a "blurred" form, in a darkened form, and the like. In this manner, first secondary video or still image 700b may be indicative of the effect on the primary video or still image 700a due to one or more vision impact parameters indicative of a light intensity and color, a duration of light intensity and color, a pupil dilation level, a time of day, and/or a vitamin A level, and the like, which may decrease the user's ability to perceive the scene in full focus.

Figure 7C:
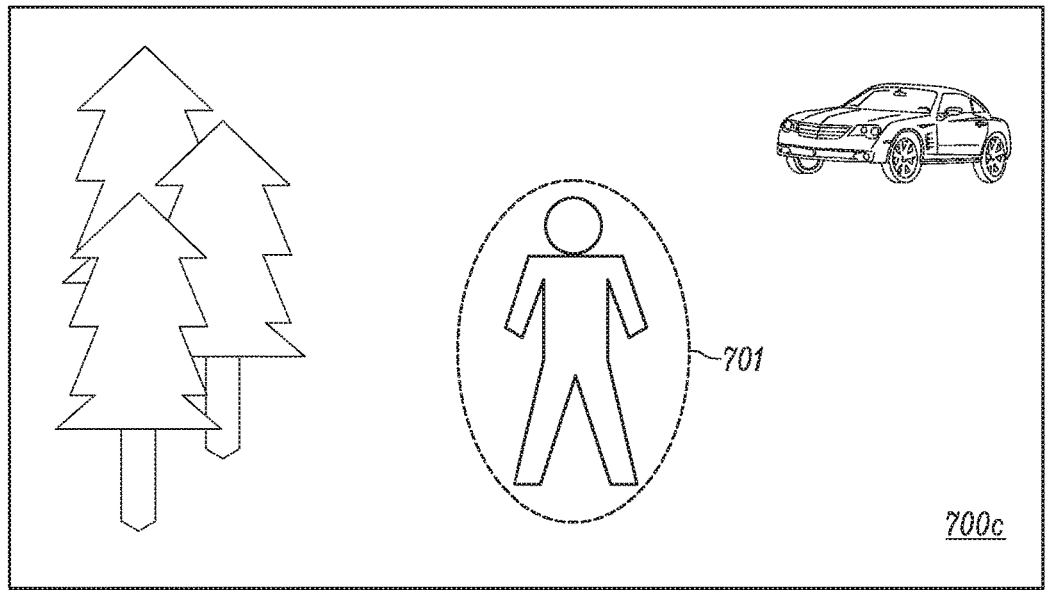
FIG. 7C is another secondary video or still image representation in accordance with some embodiments.
Figure 7D:
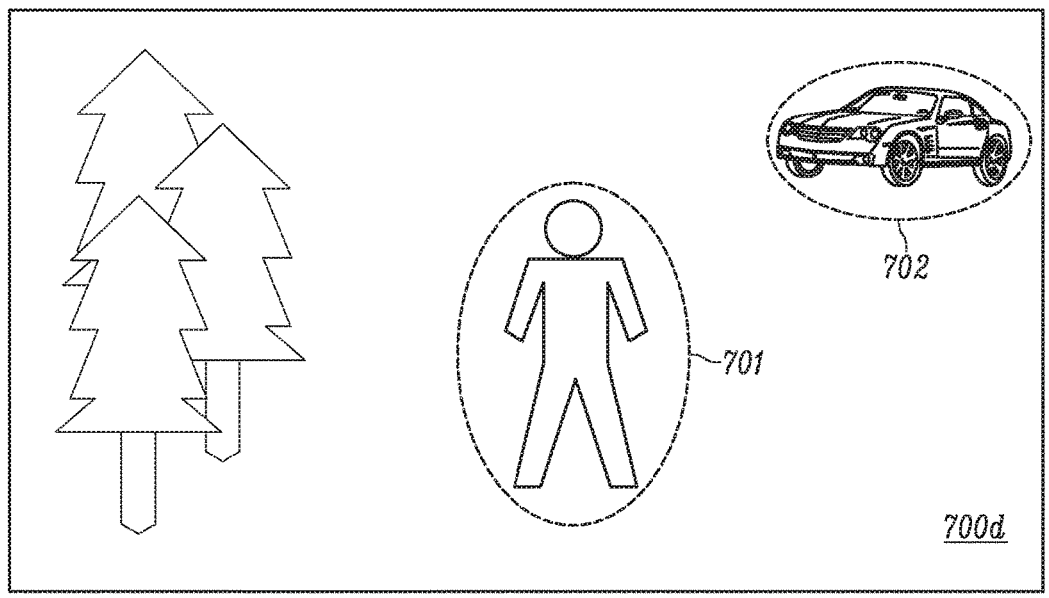
FIG. 7D is another secondary video or still image representation in accordance with some embodiments.

As illustrated in FIG. 7C, a first overlay 701 may be applied to generate a second secondary video or still image 700c. For example, the first overlays 701 may be represented as an area with increased resolution, enhanced clarity, and the like. Thus, the area of the second secondary video or still image 700c where first overlay 701 is disposed may be representative of a visual perspective of the user of the imaging device, such as imaging device 110, used to record the primary video or still image 700a.

For example, first overlay 701 may correspond to a focus field of the user, which is a portion of the scene represented in the primary video or still image 700a on which the user's eye was focused. In this manner, first overlay 701 may be determined from the vision impact correlation between the primary video or still image 700a and one or more vision impact parameters indicative of an eye direction and/or a pupil focus depth.

Additionally or alternatively, a second overlay 702 may be applied to correspond to a peripheral trigger area of the scene, which is a portion of the scene with a high energy that may be indicative of scene motion. This is illustrated by third secondary video or still image 700d shown in FIG. 7D. In this manner, second overlay 702 may be determined from the vision impact correlation between the primary video or still image 700a and one or more vision impact parameters indicative of a peripheral motion area of the primary video or still image 700a.

This vision impact correlation may be determined at least in part by a progressive analysis to exclude outliers and false positives. For example, when high energy in a frame or frames is detected, it is likely that the user will focus on it for an instant. When an area of the scene with the high energy was a focus point—that is, when the user's eye direction moved to the peripheral motion area—the high energy area may be flagged to indicate that first overlay 602 is required. Instead, when the vision impact correlation indicates that the user's eye direction did not move to the peripheral motion area within a predetermined time frame (for example, two seconds), the likelihood of user focus on the high energy area is diminished and first overlay 602 may not be required for this area. Processing of adjacent frame groups may be used to determine whether the user's eye in fact changed focus to the high energy area, as will be described in more detail below.

This may be represented by selectively applying first overlay 701 and second overlay 702 to continuous frames in a time sequence. For example, a change in focus may be illustrated by applying first overlay 701 to an initial group of frames in the time sequence, by applying first overlay 701 and second overlay 702 to a subsequent group of frames in the time sequence, and by applying only second overlay 702 to a final group of frames in the time sequence, thus indicating a shift in focus by the user.

Figure 7E:
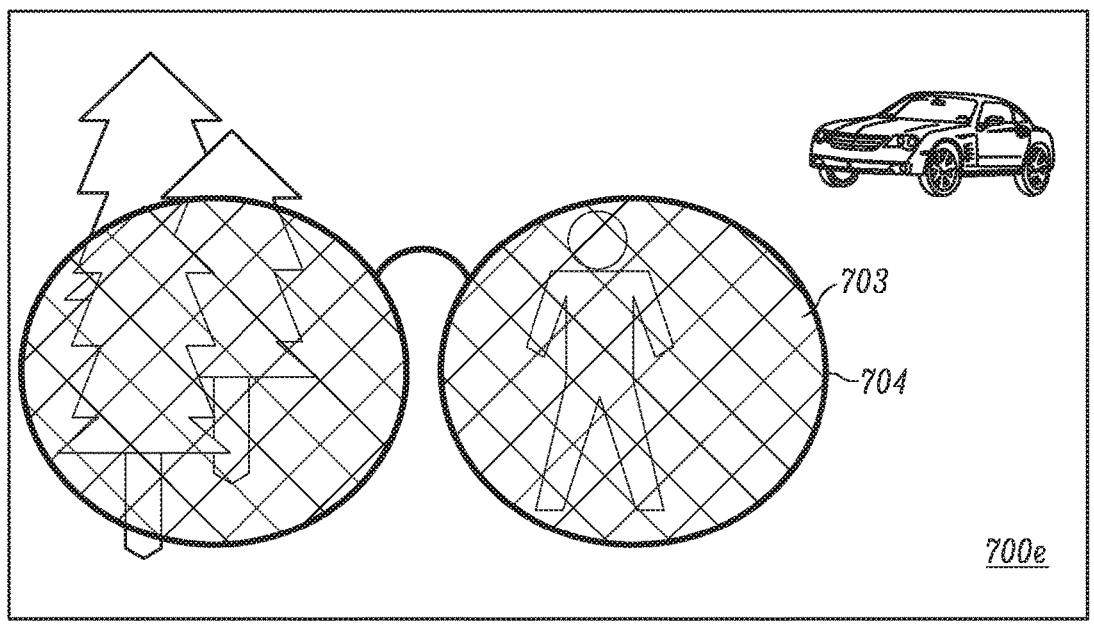
FIG. 7E is another secondary video or still image representation in accordance with some embodiments.

As illustrated in FIG. 7E, in secondary video or still image 700e a third overlay 703 and a fourth overlay 704 have been applied to the primary video or still image 700a. For example, third overlay 703 may be a filter applied over a portion of the scene bounded by fourth overlay 704. Third overlay 703 as illustrated is a shading effect.

Additionally, fourth overlay 704 may be an object overlay applied to a portion of the primary video or still image 700a to represent possible blockage of vision from a user. In this manner, third overlay 703 and fourth overlay 704 may be determined from the vision impact correlation between the primary video or still image 700a and one or more vision parameters indicative of a presence of eyewear such as corrective lenses or sunglasses, an eyelid state, and the like. Thus, third overlay 703 and fourth overlay 704 together represent sunglasses having a solid frame and darkened lenses. To represent non-shaded eyeglasses, only fourth overlay 704 may be applied.

While FIGS. 7A through 7E are separately illustrated, it will be understood that alternative embodiments may utilize multiple separately illustrated overlays in combination.

Figure 8A:
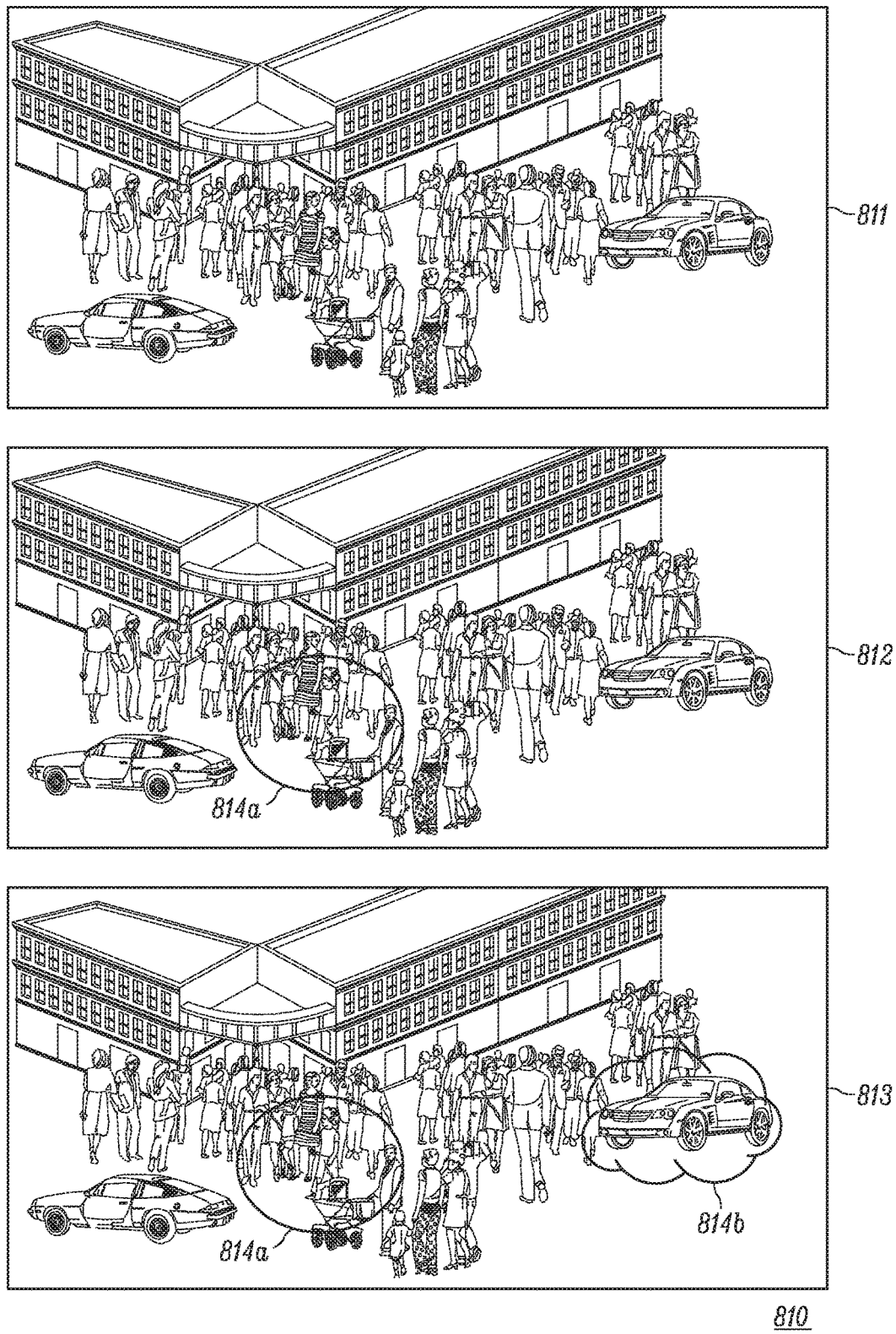
FIG. 8A is a captured scene in accordance with some embodiments.

FIG. 8A illustrates a captured scene 800 in more detail. As illustrated, scene 800 is represented in three formats simultaneously. First rendering 811 shows raw image or video data capture from an imaging device, such as imaging device 110, showing the overall field-of-view of the user. First rendering 811 shows all raw data intact and with no editing, and may be used for any capture mode, such as wide-view, panoramic, and the like. Thus, the first rendering 811 may correspond to a more detailed illustration of the primary video or still image 700a of FIG. 7A above.

A second rendering 812 is a foveated rendering where the user's focus field is highlighted in the frame. The focus field is determined, for example, in the manner described above. The identified focus field may be highlighted by using a first high-encoding mode for focus field area 814a compared with a blurred or low-encoding mode for the remainder of the frame. Thus, the second rendering 812 may correspond to a more detailed illustration of the second secondary video or still image 700c of FIG. 7C above. As described above, the focus field area 814a may be generated as an overlay or by using transcoding on the raw image or video data.

Third rendering 813 is an additional foveated rendering where a high energy area is highlighted in addition to the user's focus field. In addition to the focus field area 814a, the third rendering 813 also highlights a high energy area 814b to illustrate the presence of a peripheral trigger. Thus, the third rendering 813 may correspond to a more detailed illustration of the third secondary video or still image 700d of FIG. 7D above. Although the particular illustration of FIG. 8A shows all three formats represented simultaneously, individual formats or combinations thereof may be rendered and displayed separately.

Figure 8B:
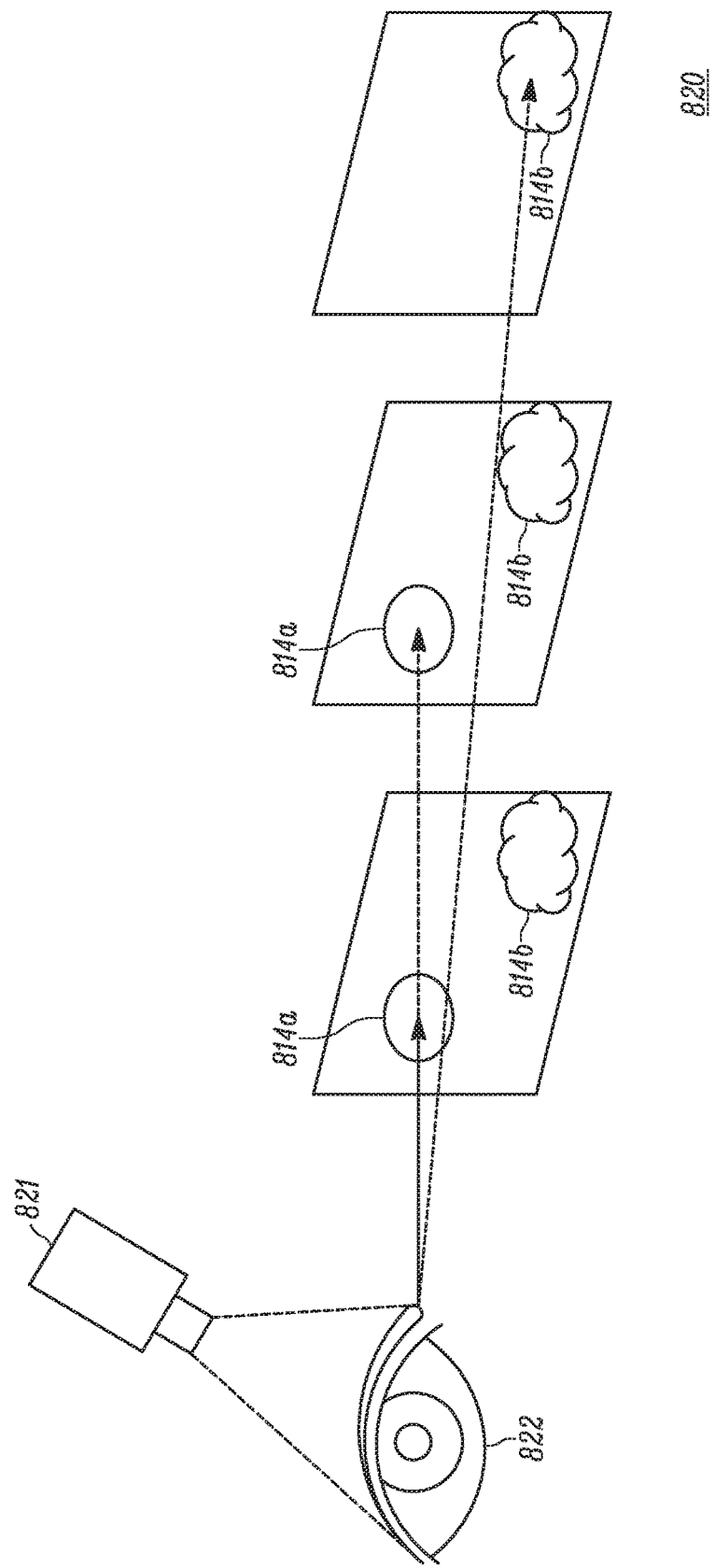
FIG. 8B is a next-frame analysis in accordance with some embodiments.

FIG. 8B illustrates an exemplary next-frame analysis 820 for determining whether a high energy area causes a shift in user focus. Next-frame analysis 820 may thus illustrate the real-time determination of block 204 of FIG. 2 above or the post-processing determination of block 303 of FIG. 3 above. As illustrated, sensor 821 tracks a user's eye 822. For example, the sensor 821 may track one or more of an X/Y movement, rod/cone size, and pupil/aperture size to determine the user's focus field. This data is tracked and logged as at least one vision impact parameter along with a timestamp as detailed above. In this example, the vision impact correlation includes data relating to a correspondence between the timestamp and a frame identifier, between the X/Y movement data and an (x,y) coordinate within the frame, and the like.

Adjacent frame groups 823a, 823b, and 823c are then utilized to determine whether the user's eye 822 eventually changed focus field to the high energy area 814b. As illustrated, the user's eye 822 indicates a focus on focus field 814a in frame groups 823a and 823b. Moreover, the user's eye 822 indicates a change in focus to high energy area 814b in frame group 823c. Thus, the likelihood of peripheral view interference with the user's focus point is high. When, however, the user's eye 822 did not move to the high energy area 814b within a predetermined number of frames, the likelihood of peripheral view interference with the user's focus point is low and further processing may not be required.

Figure 8C:
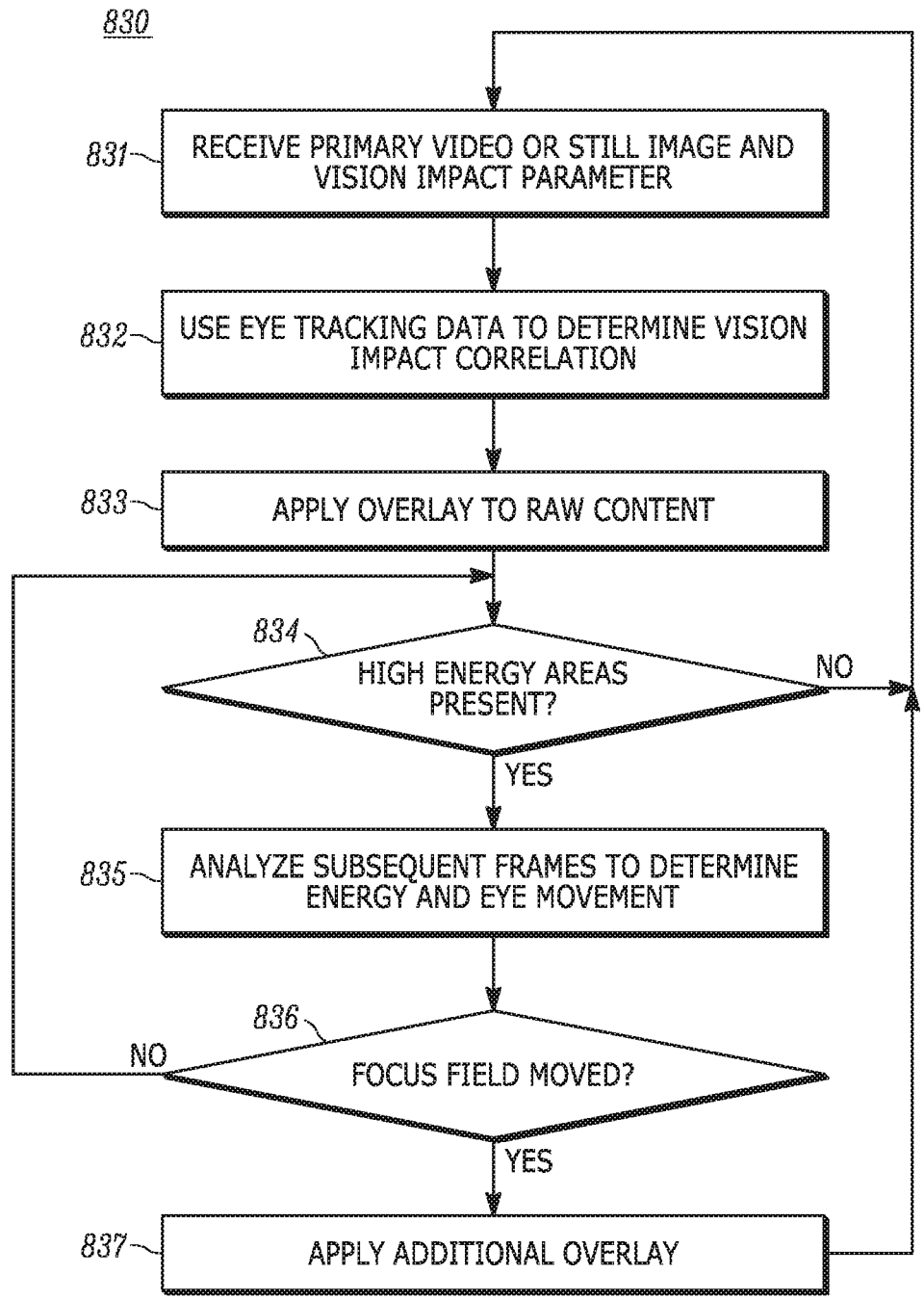
FIG. 8C is a flowchart of a method of generating a secondary video or still image in accordance with some embodiments.

FIG. 8C illustrates an exemplary method 830 of generating a secondary video or still image indicating a high energy area. The method 830 is described in relation to the rendering system 580, but could be performed using another system or systems. as illustrated in FIG. 8C, the method 830 begins at block 831 where the fourth electronic processor 601 receives the primary video or still image, such as primary video or still image 700a, and the at least one vision impact parameter, from the fourth memory 602. At block 832, the fourth electronic processor 601 uses eye tracking data to determine the vision impact correlation indicative of the focus field. The eye tracking data may be data that has previously been determined by performing eye tracking analytics in real-time with respect to obtaining the at least one vision impact parameter, or data that is determined by performing eye tracking analytics here in block 832. Next, at block 833, the fourth electronic processor 601 applies an overlay, such as overlay 701, to the raw content to show the focus field. Next, at block 834, the fourth electronic processor 601 analyzes the raw content to detect whether high energy areas are present.

When the fourth electronic processor 601 determines that no high energy areas are present, the method 830 returns to block 832 for a subsequent frame. When the fourth electronic processor 601 determines that high energy areas are present, the method 830 proceeds to block 835 and analyzes a predetermined number of subsequent frames to determine energy and eye movement. Subsequently, at block 836, the fourth electronic processor 601 determines whether the focus field moved to the high energy area. When the fourth electronic processor 601 determines that the focus field did not move to the high energy area, the method 830 returns to block 834 to determine whether high energy areas are present in a subsequent frame. When the fourth electronic processor 601 determines that the focus field did move to the high energy area, the method 830 proceeds to block 837 and the fourth electronic processor 601 applies an additional overlay, such as overlay 702, to the high energy area in addition to overlay 701. Then, the method 830 returns to block 832 for a subsequent frame.

Figure 9:
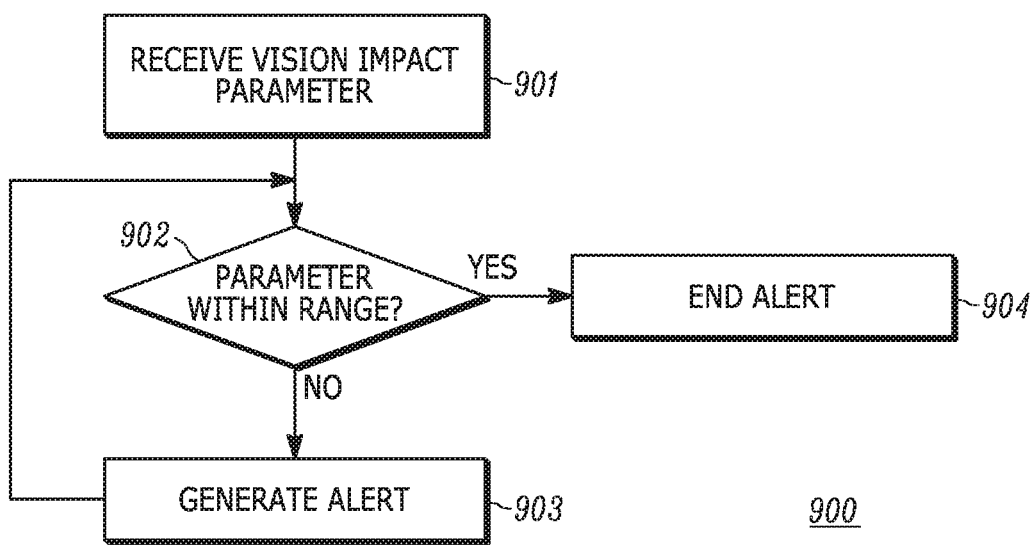
FIG. 9 is a flowchart of a method of generating an alert in accordance with some embodiments.

FIG. 9 illustrates an exemplary method 900 of generating an alert. The method 900 is described in relation to the second visual perception determination system 380, but could be performed using another system or systems. As illustrated in FIG. 9, the method 900 begins at block 901 where the second electronic processor 403 receives the primary video or still image. Next, at block 902, the second electronic processor 403 analyzes the vision impact parameter against a predetermined range. When the second electronic processor 403 determines that the vision impact parameter is outside of the predetermined range, the second electronic processor 403 causes the second communication interface 402 to generate an alert at block 903. The alert may be a haptic alert, an audible signal, a visual indicator, and the like. After block 903, the method returns to block 902 and checks the vision impact parameter against the predetermined range again. When the processor determines that the vision impact parameter is within the predetermined range, the method proceeds to block 904 and any alerts, when present, are stopped. Additionally or alternatively, the alert may be stopped by a manual input, a voice command, a time-out, and the like.

In this manner, an alert may be generated, for example, when an inspector has not spent sufficient time at a task to properly see what is being inspected, when a person's eyes have not adjusted to a change in lighting, and the like. Thus, the alert may notify a user to wait a specified amount of time for his or her vision to stabilize.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of assisting in determining visual perception, the method comprising:
   receiving, at an electronic computing device, a primary video or still image from an imaging device;
   receiving, at the electronic computing device, at least one vision impact parameter from at least one sensor device, the at least one vision impact parameter being indicative of an ability of an observer to visually perceive a scene captured in the primary video or still image;
   storing the primary video or still image and the at least one vision impact parameter in a memory;
   identifying, by a processor electrically coupled to the memory, a timing correlation between the primary video or still image and the at least one vision impact parameter;
   storing the timing correlation in the memory;
   determining, by the processor, a vision impact correlation on the primary video or still image as a function of the at least one stored vision impact parameter and the timing correlation;
   generating, by the processor, a secondary video or still image according to the determined vision impact correlation; and
   generating an alert when the determined vision impact correlation is outside of a predetermined range.

2. The method according to claim 1, wherein generating the secondary video or still image includes applying at least one selected from the group of a field of view overlay and a light adaptation filter to the primary video or still image.

3. The method according to claim 1, wherein generating the secondary video or still image is performed in real-time with respect to determining the vision impact correlation.

4. The method according to claim 1, wherein generating the secondary video or still image is performed during a post-processing operation.

5. The method according to claim 1, wherein receiving at least one vision impact parameter from at least one sensor device includes receiving a sensed focus field of the observer.

6. The method according to claim 5, wherein receiving at least one vision impact parameter from at least one sensor device includes receiving, at substantially a same time as receiving the primary video or still image, at least one selected from the group consisting of an eye direction, a pupil focus depth, an observer location, and a peripheral motion area of a scene present in the primary video or still image.

7. The method according to claim 5, wherein receiving at least one vision impact parameter from at least one sensor device includes generating, at a time of a post-processing operation, at least one selected from the group consisting of an eye direction, a pupil focus depth, an observer location, and a peripheral motion area of a scene present in the primary video or still image.

8. The method according to claim 1, wherein receiving at least one vision impact parameter from at least one sensor device includes receiving a light adaptation state of an eye.

9. The method according to claim 8, wherein receiving at least one vision impact parameter from at least one sensor device includes receiving at least one selected from the group consisting of a light intensity and color, a duration of light intensity and color, a pupil dilation level, an observer location, a presence of eyewear, an eyelid state, a time of day, and a vitamin A level.

10. A visual perception determination assistance system, the system comprising:
   a communication interface configured to
     receive a primary video or still image from an imaging device, and
     receive at least one vision impact parameter from at least one sensor device, the at least one vision impact parameter being indicative of an ability of an observer to visually perceive a scene captured in the primary video or still image;
   a processor electrically coupled to the communication interface and configured to identify a timing correlation between the primary video or still image and the at least one vision impact parameter; and a memory electrically coupled to the processor and configured to store the primary video or still image, the at least one vision impact parameter, and the timing correlation wherein the processor is further configured to determine a vision impact correlation on the primary video or still image as a function of the at least one stored vision impact parameter and the timing correlation, and generate a secondary video or still image according to the determined vision impact correlation; and wherein the communication interface is further configured to generate an alert when the determined vision impact correlation is outside of a predetermined range.

11. The visual perception determination assistance system according to claim 10, wherein the secondary video or still image includes a field of view overlay and/or a light adaptation filter applied to the primary video or still image.

12. The visual perception determination assistance system according to claim 10, wherein the processor is configured to generate the secondary video or still image in real-time with respect to determining the vision impact correlation.

13. The visual perception determination assistance system according to claim 10, wherein the processor is configured to generate the secondary video or still image during a post-processing operation.

14. The visual perception determination assistance system according to claim 10, wherein the at least one vision impact parameter is indicative of a sensed focus field of the observer.

15. The visual perception determination assistance system according to claim 14, wherein the at least one vision impact parameter is received at substantially a same time as the primary video or still image, and is at least one selected from the group consisting of an eye direction, a pupil focus depth, an observer location, and a peripheral motion area of a scene present in the primary video or still image.

16. The visual perception determination assistance system according to claim 14, wherein the at least one vision impact parameter is generated at a time of a post-processing operation, at least one selected from the group consisting of an eye direction, a pupil focus depth, an observer location, and a peripheral motion area of a scene present in the primary video or still image.

17. The visual perception determination assistance system according to claim 10, wherein the at least one vision impact parameter is indicative of a light adaptation state of an eye.

18. The visual perception determination assistance system according to claim 10, wherein the at least one vision impact parameter is at least one selected from the group consisting of a light intensity and color, a duration of light intensity and color, a pupil dilation level, an observer location, a presence of eyewear, an eyelid state, a time of day, and a vitamin A level.

* * * * *